United States Patent
Allen et al.

(10) Patent No.: US 9,760,913 B1
(45) Date of Patent: Sep. 12, 2017

(54) REAL TIME USABILITY FEEDBACK WITH SENTIMENT ANALYSIS

(71) Applicant: International Business Machines Corporation, Armonk, NY (US)

(72) Inventors: Mark T. Allen, Scarborough (CA); Amy M. Gill, Brampton (CA); Scott M. Guminy, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/332,068

(22) Filed: Oct. 24, 2016

(51) Int. Cl.
*G06K 9/00* (2006.01)
*G06Q 30/02* (2012.01)
*G06F 9/44* (2006.01)

(52) U.S. Cl.
CPC .......... *G06Q 30/0282* (2013.01); *G06F 8/77* (2013.01)

(58) Field of Classification Search
USPC ........................................................ 382/100
See application file for complete search history.

(56) References Cited

U.S. PATENT DOCUMENTS

| | | | |
|---|---|---|---|
| 5,774,591 A * | 6/1998 | Black | G06K 9/00315 382/118 |
| 2005/0112535 A1 | 5/2005 | McIntosh | |
| 2006/0224046 A1* | 10/2006 | Ramadas | A61B 5/0002 600/300 |

FOREIGN PATENT DOCUMENTS

WO   WO2016069058 A1   5/2016

* cited by examiner

*Primary Examiner* — Gregory F Cunningham
(74) *Attorney, Agent, or Firm* — Brown & Michaels, PC; Isaac J. Gooshaw

(57) ABSTRACT

Providing user software feedback and conflict resolution from a kiosk device. A computer of the kiosk captures audio and visual data from a user during an interaction between the user and software of the kiosk device. The computer analyzes the audio data and visual data to determine at least a sentiment of the user relative to the interaction and determines a score for the interaction. If the score is greater than a threshold, the computer determining at least a portion of the software needs improvement based on the score and the determined sentiment of the user during the interaction.

18 Claims, 5 Drawing Sheets

REAL TIME USABILITY FEEDBACK WITH SENTIMENT ANALYSIS

BACKGROUND

The present invention relates to real time usability feedback, and more specifically to real time usability feedback with sentiment analysis.

Collecting accurate usability data for software already present in the field is difficult with today's approaches. Conventionally, user experience feedback is collected during development of software and typically focuses on new functionality as the new functionality is easier to test for than existing functionality. Furthermore, testing or obtaining feedback regarding software functionality that has already been developed is time consuming and is not normally a priority. Most of the feedback regarding software functionality that has already been in the marketplace tracks the user experience through mouse movements.

Problems with functionality of software in user kiosks can cause delays. Furthermore, user interactions with touch screens or touch paradigms are difficult to track and receive user feedback from.

SUMMARY

According to one embodiment of the present invention a method of providing user software feedback from a kiosk device comprising a computer. The method comprising the steps of: the computer capturing audio data from a user during an interaction between the user and software of the kiosk device; the computer capturing visual data from the interaction between the user and the software of the kiosk device; the computer analyzing the audio data and visual data to determine at least a sentiment of the user relative to the interaction; the computer determining a score for the interaction; and if the score is greater than a threshold, the computer determining at least a portion of the software needs improvement based on the score and the determined sentiment of the user during the interaction.

According to another embodiment of the present invention, a computer program product of providing user software feedback from a kiosk device is disclosed. The kiosk device comprising a computer comprising at least one processor, one or more memories, one or more computer readable storage media. The computer program product comprising a computer readable storage medium having program instructions embodied therewith, the program instructions executable by the computer to perform a method comprising: capturing, by the computer, audio data from a user during an interaction between the user and software of the kiosk device; capturing, by the computer, visual data from the interaction between the user and the software of the kiosk device; analyzing, by the computer, the audio data and visual data to determine at least a sentiment of the user relative to the interaction; determining, by the computer, a score for the interaction; and if the score is greater than a threshold, determining, by the computer, at least a portion of the software needs improvement based on the score and the determined sentiment of the user during the interaction.

According to another embodiment of the present invention, a computer system for providing user software feedback from a kiosk device is disclosed. The kiosk device comprising a computer comprising at least one processor, one or more memories, one or more computer readable storage media having program instructions executable by the computer to perform the program instructions. The program instructions comprising: capturing, by the computer, audio data from a user during an interaction between the user and software of the kiosk device; capturing, by the computer, visual data from the interaction between the user and the software of the kiosk device; analyzing, by the computer, the audio data and visual data to determine at least a sentiment of the user relative to the interaction; determining, by the computer, a score for the interaction; and if the score is greater than a threshold, determining, by the computer, at least a portion of the software needs improvement based on the score and the determined sentiment of the user during the interaction.

According to another embodiment of the present invention, a method of providing support for conflict resolution during an interaction between a user and software of a kiosk device is disclosed. The method comprising the steps of: a computer receiving data from one or more kiosk devices in a venue comprising: audio statements from the user during the interaction between the user and the software of the kiosk device; and captured visual data showing at least facial expressions and eye movements of the user at the kiosk device; the computer analyzing the data to determine a type of conflict is present for at least one user with the software of the kiosk device; the computer determining a type of conflict exists for the at least one user; and the computer providing the at least one user with one or more resolutions to aid in alleviating the determined type of conflict.

According to another embodiment of the present invention, a computer program product providing support for conflict resolution during an interaction between a user and software of a kiosk device is disclosed. The kiosk comprises a computer. The computer comprising at least one processor, one or more memories, one or more computer readable storage media having program instructions executable by the computer to perform the program instructions. The program instructions comprising: receiving, by the computer, data from one or more kiosk devices in a venue comprising: audio statements from the user during the interaction between the user and the software of the kiosk device; and captured visual data showing at least facial expressions and eye movements of the user at the kiosk device; analyzing, by the computer, the data to determine a type of conflict is present for at least one user with the software of the kiosk device; determining, by the computer, a type of conflict exists for the at least one user; and the computer providing the at least one user with one or more resolutions to aid in alleviating the determined type of conflict.

According to another embodiment of the present invention, a computer system for providing support for conflict resolution during an interaction between a user and software of a kiosk device is disclosed. The kiosk device comprising a computer comprising at least one processor, one or more memories, one or more computer readable storage media having program instructions executable by the computer to perform the program instructions. The program instructions comprising: receiving, by the computer, data from one or more kiosk devices in a venue comprising: audio statements from the user during the interaction between the user and the software of the kiosk device; and captured visual data showing at least facial expressions and eye movements of the user at the kiosk device; analyzing, by the computer, the data to determine a type of conflict is present for at least one user with the software of the kiosk device; determining, by the computer, a type of conflict exists for the at least one user; and the computer providing the at least one user with one or more resolutions to aid in alleviating the determined type of conflict.

DETAILED DESCRIPTION

Figure 1:
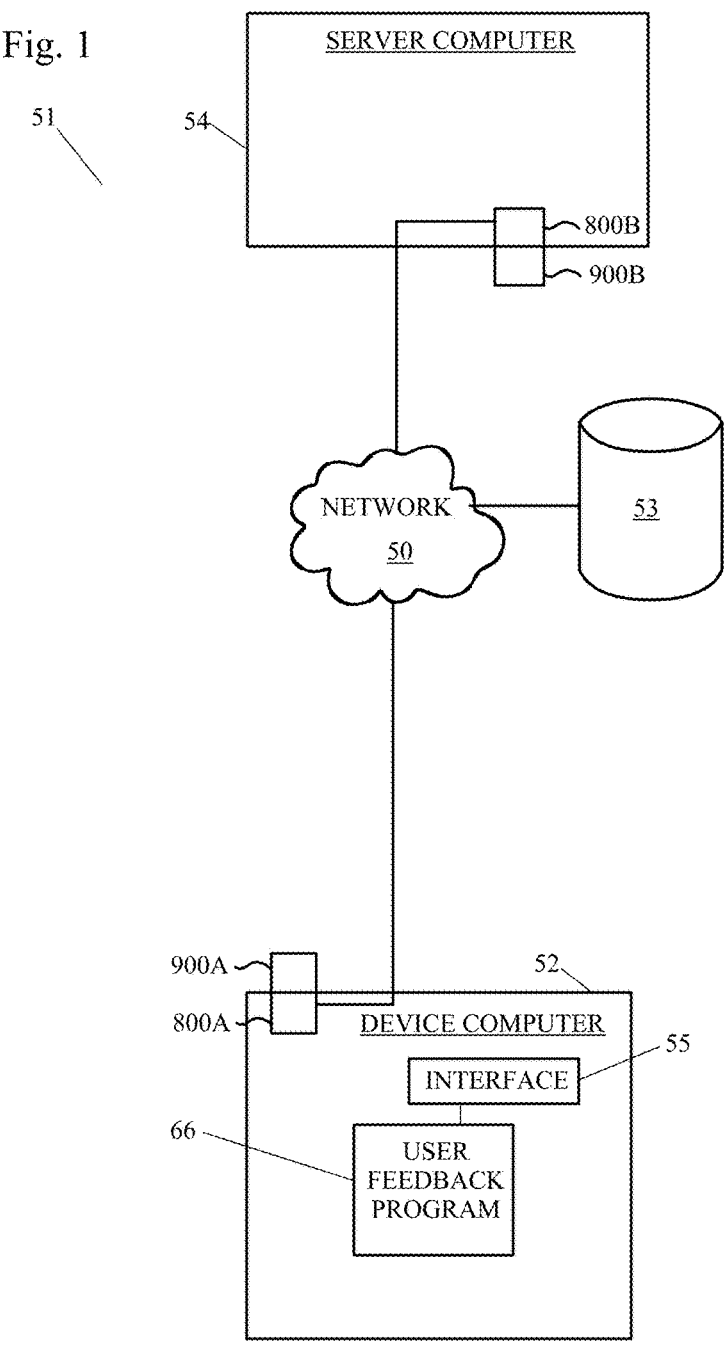
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may be a kiosk device, which is a structure in a public area used for providing information to or receiving information from a user which has at least one interactive display screen. The kiosk device may be, but is not limited to, an airport kiosk device, a retail self-checkout, a restaurant ordering kiosk device, a customs kiosk device, or another type of machine in which a user may purchase a product or input data for a service. The device computer 52 may contain an interface 55, which may accept commands and data entry from a user. The interface can be, for example, a command line interface, a graphical user interface (GUI), a natural user interface (NUI) or a touch user interface (TUI). The device computer 52 preferably includes a user feedback program 66. While not shown, it may be desirable to have the user feedback program 66 be present on the server computer 54. The device computer 52 includes a set of internal components 800a and a set of external components 900a, further illustrated in FIG. 4.

Figure 4:
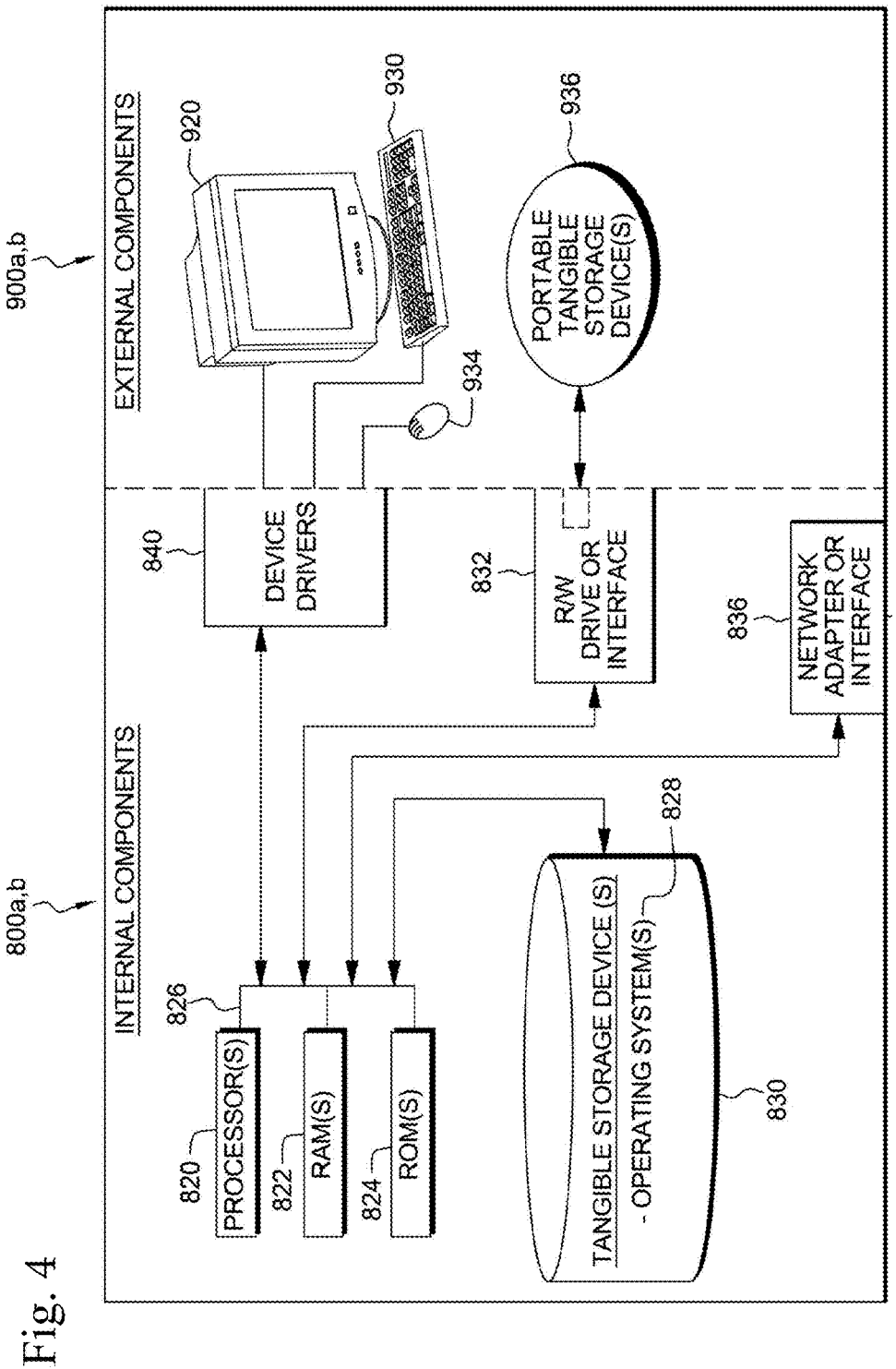
FIG. 4 illustrates internal and external components of a client computer and a server computer in which illustrative embodiments may be implemented.

Server computer 54 includes a set of internal components 800b and a set of external components 900b illustrated in FIG. 4. In the depicted example, server computer 54 provides information, such as boot files, operating system images, and applications to the device computer 52. Server computer 54 can compute the information locally or extract the information from other computers on network 50. The server computer 54 may contain the user feedback program 66.

Program code and programs such as the user feedback program 66 may be stored on at least one of one or more computer-readable tangible storage devices 830 shown in FIG. 4, on at least one of one or more portable computer-readable tangible storage devices 936 as shown in FIG. 4, or on storage unit 53 connected to network 50, or may be downloaded to a device computer 52 or server computer 54, for use. For example, program code and programs such as user feedback program 66 may be stored on at least one of one or more storage devices 830 on server computer 54 and downloaded to device computer 52 over network 50 for use. Alternatively, server computer 54 can be a web server, and the program code, and programs such as user feedback program 66 may be stored on at least one of the one or more storage devices 830 on server computer 54 and accessed device computer 52. In other exemplary embodiments, the program code, and programs such as user feedback program 66 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 5:
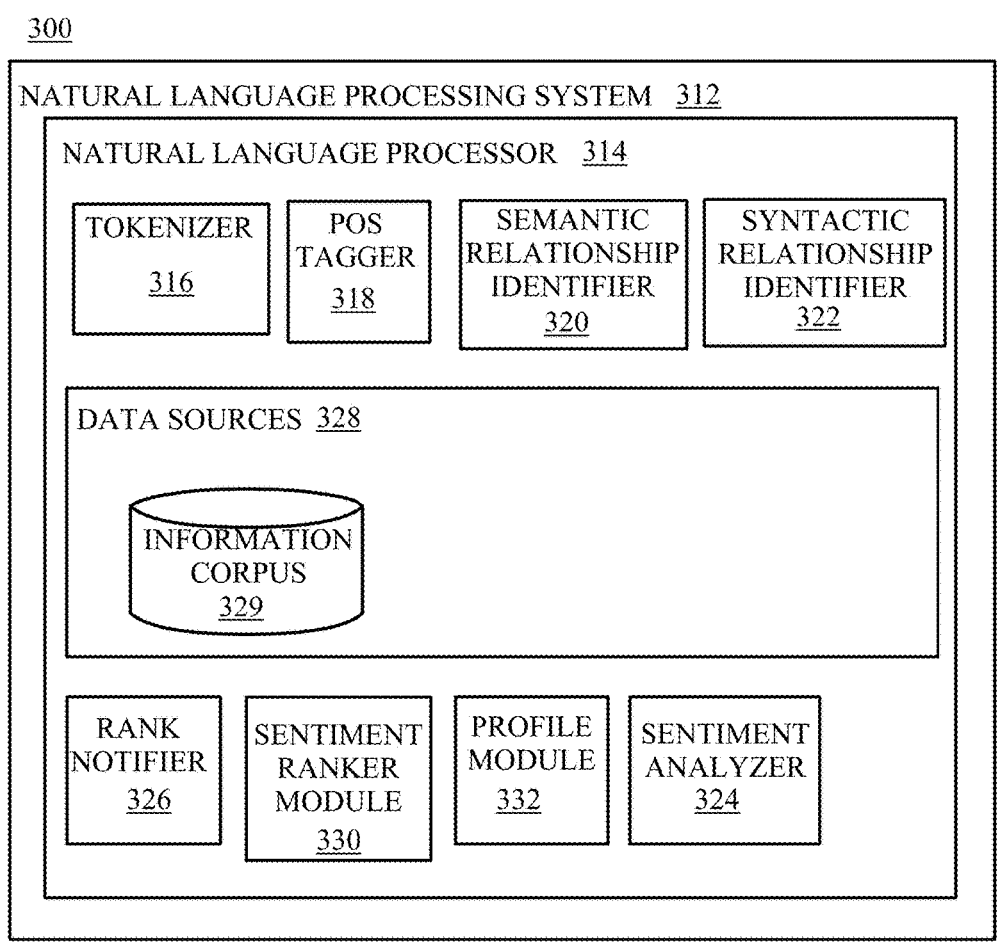
FIG. 5 illustrates a block diagram of an exemplary system architecture, including a natural language processing system, configured to use reviews to rank food products consumed or purchased at an establishment, in accordance with embodiments of the present disclosure.

Referring now to FIG. 5, shown is a block diagram of an exemplary system architecture 300, including a natural language processing system 312 which is part of the user feedback program 66, configured to use captured audio data and visual data from user interaction with a kiosk device, in accordance with embodiments of the present disclosure. In some embodiments, captured audio data and visual data are analyzed by the natural language processing system 312 of the user feedback program 66 to determine sentiment of the user during their interaction with the kiosk.

The natural language processing system 312 may analyze captured audio data and visual data to determine portions of the interface of the kiosk that may need improvement or cause difficulty to some users. In some embodiments, the natural language processing system 312 may include a natural language processor 314, data sources 328, a rank notifier 326, profile module 332, and a sentiment ranker module 330.

The natural language processor 314 may be a computer module that analyzes the captured audio data and visual data of the user interaction with the kiosk. The natural language processor 314 may perform various methods and techniques for analyzing documents containing audio data converted to text (e.g., syntactic analysis, semantic analysis, etc.). The natural language processor 314 may be configured to recognize and analyze any number of natural languages. In some embodiments, the natural language processor 314 may parse passages of the documents or portion of a recorded conversation or interaction of the user with the kiosk.

Further, the natural language processor 314 may include various modules to perform analyses of the captured audio and visual data. These modules may include, but are not limited to, a tokenizer 316, a part-of-speech (POS) tagger 318, a semantic relationship identifier 320, a syntactic relationship identifier 322, profile module 332, and sentiment analyzer 324.

In some embodiments, the tokenizer 316 may be a computer module that performs lexical analysis. The tokenizer 316 may convert a sequence of characters into a sequence of tokens. A token may be a string of characters included in an electronic document and categorized as a meaningful symbol. Further, in some embodiments, the tokenizer 316 may identify word boundaries in an electronic document and break any text passages within the document into their component text elements, such as words, multiword tokens, numbers, and punctuation marks. In some embodiments, the tokenizer 316 may receive a string of characters, identify the lexemes in the string, and categorize them into tokens.

Consistent with various embodiments, the POS tagger 318 may be a computer module that marks up a word in passages to correspond to a particular part of speech. The POS tagger 318 may read a passage or other text in natural language and assign a part of speech to each word or other token. The POS tagger 318 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents or interactions of a user or group of users with a kiosk. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In some embodiments, the POS tagger 318 may tag or otherwise annotate tokens of a passage with part of speech categories. In some embodiments, the POS tagger 318 may tag tokens or words of a passage to be parsed by other components of the natural language processing system 312.

In some embodiments, the semantic relationship identifier 320 may be a computer module that is configured to identify semantic relationships of recognized text elements (e.g., words, phrases) in documents or from captured audio data and paired with visual cues captured in the visual data. In some embodiments, the semantic relationship identifier 320 may determine functional dependencies between entities and other semantic relationships.

Consistent with various embodiments, the syntactic relationship identifier 322 may be a computer module that is configured to identify syntactic relationships in a passage composed of tokens. The syntactic relationship identifier 322 may determine the grammatical structure of sentences such as, for example, which groups of words are associated as phrases and which word is the subject or object of a verb. The syntactic relationship identifier 322 may conform to formal grammar.

Consistent with various embodiments, the sentiment analyzer 324 may be a computer module that is configured to identify and categorize the sentiments associated with tokens of interest. In some embodiments, the sentiment analyzer may be configured to identify, within text passages, and annotate keywords that are preselected as high quality indicators of sentiment polarity (e.g., indicators of positive sentiment could include brilliant, excellent, or fantastic). Various tools and algorithms may be used by the sentiment analyzer 324 as are known to those skilled in the art (e.g., Naïve Bayes lexical model). The quality indicators of sentiment polarity may be correlated with specific user profiles within an establishment or the profile for the establishment.

In some embodiments, the natural language processor 314 may be a computer module that may parse a document and generate corresponding data structures for one or more portions of the document or posts. For example, in response to receiving a set of posts from a website that includes a collection of posts or reviews of food products at the natural language processing system 312, the natural language processor 314 may output parsed text elements from the product reviews as data structures. In some embodiments, a parsed text element may be represented in the form of a parse tree or other graph structure. To generate the parsed text element, the natural language processor 314 may trigger computer modules 316-324.

In some embodiments, the output of the natural language processor 314 may be stored as an information corpus 329 in one or more data sources 328. In some embodiments, data sources 328 may include data warehouses, information corpora, data models, and document repositories. The information corpus 329 may enable data storage and retrieval. In some embodiments, the information corpus 329 may be a storage mechanism that houses a standardized, consistent, clean, and integrated copy of the ingested and parsed documents of the text of the audio captured. Data stored in the information corpus 329 may be structured in a way to specifically address analytic requirements. For example, the information corpus 329 may store the captured audio data and visual data based on groups of related products (e.g., products of the same type) in order to make ranking product features easier. In some embodiments, the information corpus 329 may be a relational database.

In some embodiments, the natural language processing system 312 may include a sentiment ranker module 330. The sentiment ranker module 330 may be a computer module that is configured to generate sentiment scores for specific forms of features or qualities based on the analysis of annotated reviews or posts of the food product of an establishment. The sentiment ranker module 330 may be further configured to rank the features based on these sentiment scores.

The rank notifier 326 may be a computer module that is configured to notify users of feature rankings determined by the sentiment ranker module 330. In some embodiments, the rank notifier 326 may communicate with a rank notification receiver module.

The profile module 332 may be a computer module that is configured to establish and maintain profiles of groups of users and associated problems with the interfaces of the kiosk. The profile module 332 may store feedback and the captured sentiment in relation to portions of the interface of the kiosks.

Figure 2:
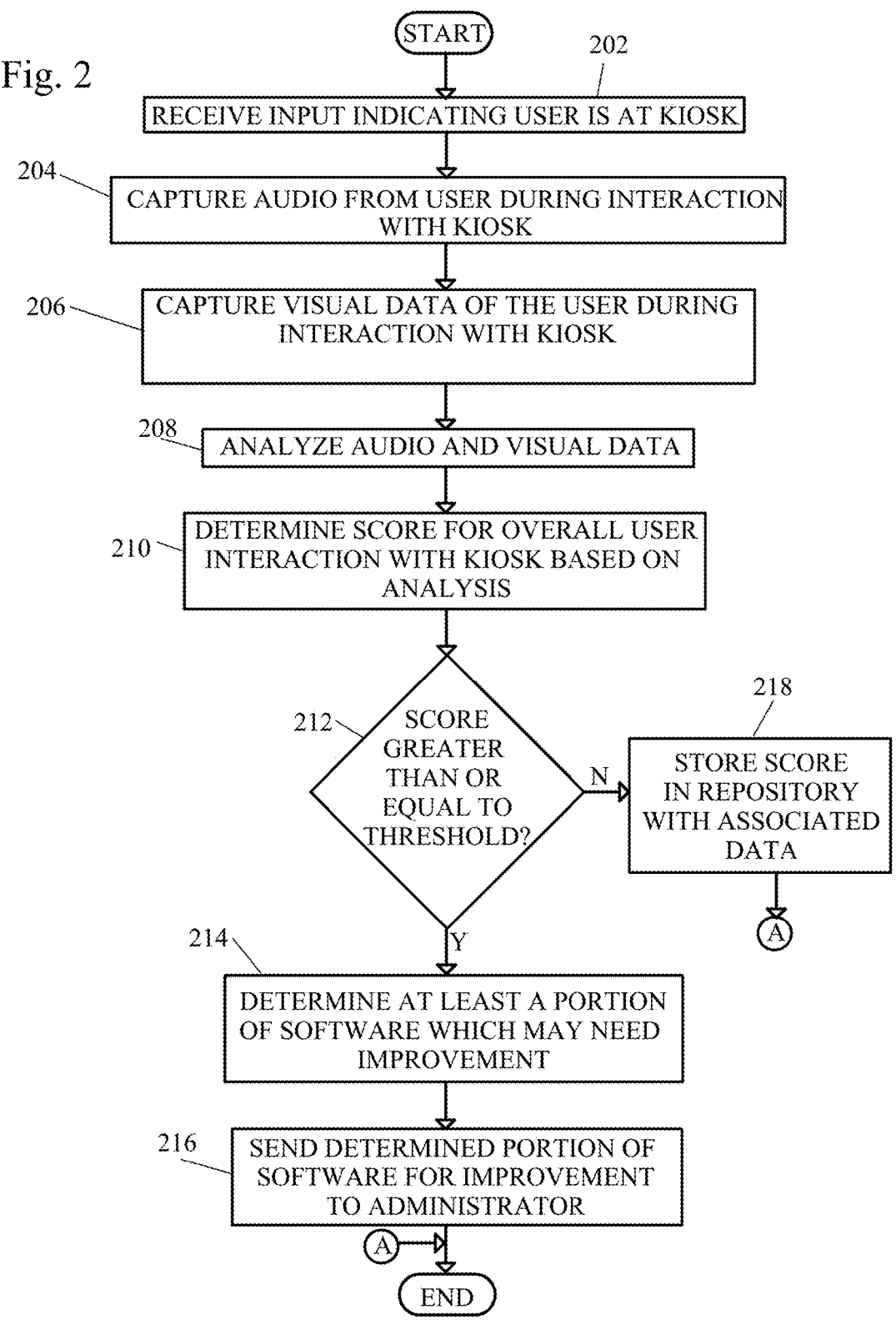
FIG. 2 shows a flow diagram of a method of providing real time usability feedback from a kiosk with sentiment analysis.

FIG. 2 shows a flowchart of a method of providing real time usability feedback from a kiosk device with sentiment analysis.

In a first step, an input indicating a user is using a kiosk device is received (step 202), for example by the user feedback program 66. The input indicating the user is using the kiosk device may be, but is not limited to, a command from a user through the user interface.

The user feedback program 66 captures audio data from the user during the user's interaction with the kiosk device (step 204). The data may be stored in a repository, for example repository 53 for analysis later or alternatively analyzed as the audio data is received. In another embodiment, only the results of the analysis could be stored.

The user feedback program 66 captures visual data of the user during the interaction with the software of the kiosk device (step 206). The data may be stored in a repository, for example repository 53 for analysis later or alternatively analyzed as the visual data is received. In another embodiment, only the results of the analysis could be stored. The visual data may include, but is not limited to, eye tracking of the user, and recordation of the user's features during the interaction with the kiosk device.

The audio and visual data stored in the repository during a user's interaction with the kiosk device is analyzed during the interaction with the kiosk device (step 208). The analysis of the audio and visual data may be used to determine a sentiment of the user during their interaction (e.g. a positive, a negative or a neutral experience). For example, sentiment analysis may be used to determine a user's emotional state during their interaction with the software of the kiosk device. Sentiment analysis is the process of computationally identifying and categorizing opinions expressed in the captured audio and visual data, especially in order to determine whether the writer's attitude towards a particular topic, product, etc., is positive, negative, or neutral.

Facial recognition may also be used with the visual data to identify a specific user of the kiosk device. The facial recognition may be integrated into the sentiment analysis. The identity of a specific user may be helpful if used in combination with user profiles, such that difficulties with specific portions or interactions with the software can be tracked based on a user's interaction to determine if specific users in a certain location, or user group may have similar problems carrying out transactions with the software of the kiosk device.

Eye tracking may additionally be determined from the visual data to determine what portion of the software the user is interacting with regardless of the actual touches or selections made by user through a screen of the kiosk device. The eye tracking may include a length of time a user spends looking at various portions of the software being displayed during their interaction with the kiosk device.

The audio data may be converted into text to leverage sentiment of the user during the transaction with the software of the kiosk device. Trigger phrases and keywords may be identified from the captured audio data and associated with specific sentiments. An overall sentiment may be determined from all of the audio data captured during a user interaction with the kiosk device.

A score of the overall user interaction with the kiosk device based on the analysis of the audio and visual data of the user interaction is determined (step 210).

Each metric of the user interaction as captured from analysis has a set of rules that map the metric to a score out of 100. For example, with facial recognition, the user could be happy, indifferent, somewhat upset or really angry. Each of these values will be assigned a score with the least frustrated being zero and the most frustrated being 100. Each metric will have a different mapping. In another example, with eye tracking, if it is determined that the user is staring at an area of the screen of the kiosk without doing anything. The score may be assigned as follows: 0-100 milliseconds=0, 101 milliseconds-500 milliseconds=10, 5 seconds to 20 seconds=50, etc. The mappings for each metric can be controlled/configured by a user experience professional responsible for the application. Once the scores are calculated for each metric averaged, producing a final score. The user experience professional can also configure the final threshold.

If the score is greater or equal to a threshold (step 212), the feedback program 66 determines at least a portion of the software may need improvement based on the audio and visual data of the user interacting with the kiosk device (step 214). The threshold may be manually set by an administrator.

The portion of the software which may need improvement or the portion of the software the user needs aid in using is sent to an administrator for further review (step 216) and the method ends.

It should be noted that in an alternate embodiment, the portion of the software that requires additional aid for use by the user may be sent to an administrator which can access the kiosk device and aid the user through the current or any additional transactions (conflict resolution) with the kiosk device or alternatively send a notification to another user associated with the kiosk device (e.g. customer service agent) to aid the user with the transactions of the kiosk device. The portion of the software which may need improvement may also be flagged for an administrator to allow the administrator to identify possible solutions or alterations of the software to increase usability.

If the score is not greater than or equal to a threshold (step 212), the score is stored in a repository associated with applicable audio and visual data as well as the software of the kiosk device (step 218) and the method ends. The data and the associated score from the user interaction with the software of the kiosk device may be sent to an administrator for further analysis to determine usability of the software and usage metrics.

Figure 3:
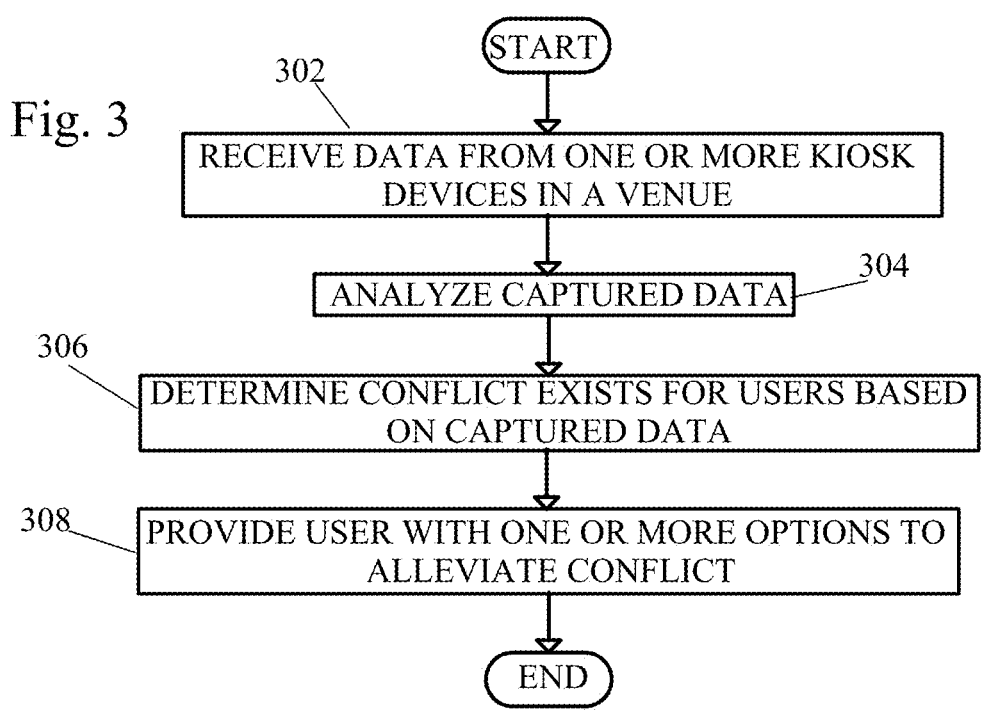
FIG. 3 shows a flow diagram of a method of providing support for conflict resolution during user interaction with software of a kiosk.

FIG. 3 shows a flow diagram of a method of providing support for conflict resolution during user interaction with software of a kiosk device.

In a first step, the user feedback program 66 receives data from one or more kiosk devices in a venue. The data preferably includes captured audio data from users during the user's interaction with the kiosk devices and visual data of the users during the interaction with the software of the kiosk devices (step 302).

The visual data may include, but is not limited to, eye movement captured through eye tracking of the users, and recordation of the user's facial features during the interaction with the kiosk device.

The audio data may include a user's verbal statements when present at the kiosk device.

The user feedback program analyzes the captured data (step 304).

Facial recognition analysis may be used with the visual data to identify a specific user of the kiosk device. The identity of a specific user may be helpful if used in combination with user profiles, such that difficulties with specific portions or interactions with the software can be tracked based on a user's interaction to determine if specific users in a certain location, or user group may have similar problems carrying out transactions with the software of the kiosk device.

Eye tracking may additionally be used with the visual data to determine what portion of the software the user is interacting with regardless of the actual touches or selections made by a user through a screen of the kiosk device. The eye tracking may include a length of time a user spends looking at various portions of the software being displayed during their interaction with the kiosk device.

The audio data may be converted into text to leverage sentiment of the user during the transaction with the software of the kiosk device. Trigger phrases, keywords, tone, volume and pitch may be identified from the captured audio and associated with specific sentiments. An overall sentiment may be determined from all of the audio captured during a user interaction with the kiosk device.

The user feedback program 66 determines whether a type of conflict exists for the user from the analysis of the data captured (step 306). Based on an identified conflict from the captured data, the identified conflict may be searched for in a repository or look up table. Furthermore, a set of common resolutions can be created and stored in a database that can be used by the software. This list of common resolutions would increase as user interactions increase.

For example, the type of conflict may be stored in a repository, for example repository 53. The type of conflict may be stored with an associated resolution which was at least attempted, identified sources and causes of the conflicts, user profiles that are used to or have been used to generate more realistic user personas for user interface testing; and a type of users that utilize the kiosk device and one or more types of conflict that are commonly encountered by that type of user. The conflict stored may also contain data relating to usability and summary usage metrics from the user's interaction with the software of the kiosk device.

The user feedback program 66, based on the determined type of conflict, provides to the user, one or more options that are predicted to alleviate the type of conflict (step 308) and the method ends. For example, the identified conflict may be present in a lookup table that contains a plurality of options that are predicted to alleviate the type of conflict, and selecting one or more options to present to the user based on collective user history regarding conflict resolution and a category to which the user has been determined to belong.

FIG. 4 illustrates internal and external components of a device computer 52 and server computer 54 in which illustrative embodiments may be implemented. In FIG. 4, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and user feedback program 66 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. User feedback program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. User feedback program 66 can be downloaded to the device computer 52 and server computer 54 from an external computer via a network (for example, the Internet, a local area network or other, wide area network) and network adapter or interface 836. From the network adapter or interface 836, user feedback program 66 is loaded into hard drive 830. User feedback program 66 can be downloaded to the server computer 54 from an external computer via a network (for example, the Internet, a local area network or other, wide area network) and network adapter or interface 836. From the network adapter or interface 836, user feedback program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

User feedback program 66 can be written in various programming languages including low-level, high-level, object-oriented or non object-oriented languages. Alternatively, the functions of a user feedback program 66 can be implemented in whole or in part by computer circuits and other hardware (not shown).

Certain embodiments of the present invention aid in determining which portions of software and/or software interface needs improvement based on collected sentiments of the user during their interaction with the software, providing real time user feedback during the course of the life of the software's implementation. By providing real time user feedback over the course of the life of the software's implementation, efficiency of the software and the associated hardware running the software is increased and/or maintained during the life of the software.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing support for conflict resolution during an interaction between a user and software of a kiosk device comprising the steps of:
 a computer receiving data from one or more kiosk devices in a venue comprising:
  audio statements from the user during the interaction between the user and the software of the kiosk device; and
  captured visual data showing at least facial expressions and eye movements of the user at the kiosk device;
 the computer analyzing the data to determine a type of conflict is present for at least one user with the software of the kiosk device;
 the computer determining a type of conflict exists for the at least one user; and
 the computer providing the at least one user with one or more resolutions to aid in alleviating the determined type of conflict.

2. The method of claim 1, wherein the audio statements captured are analyzed by applying voice-to-text analysis and detection of variations in the audio as spoken by the user to determine sentiment.

3. The method of claim 1, wherein visual data captured is analyzed through facial expression analysis to determine a sentiment of the user and eye tracking to determine how the eyes of the user interact with the software of the kiosk device during the interaction.

4. The method of claim 1, wherein the resolutions provided to aid in alleviating the determined type of conflict are selected based on a collective user history regarding conflict resolution and a category to which the at least one user has been determined to belong.

5. The method of claim 1, further comprising the step of: generating a table with detected conflicts from multiple users and resolutions attempted.

6. The method of claim 5, wherein the table further comprises data selected from the group consisting of: usability and summary usage metrics; identified sources and causes of the conflicts, user profiles generated for more realistic user personas for user interface testing; and a type of users that utilize the kiosk device with one or more types of conflicts which are commonly encountered by that type of user.

7. A computer program product for providing support for conflict resolution during an interaction between a user and software of a kiosk, the kiosk device comprising a computer comprising at least one processor, one or more memories, one or more computer readable storage media, the computer program product comprising a computer readable storage medium having program instructions embodied therewith, the program instructions executable by the computer to perform a method comprising:

providing support for conflict resolution during an interaction between a user and software of a kiosk device comprising the steps of:

receiving, by the computer, data from one or more kiosk devices in a venue comprising: audio statements from the user during the interaction between the user and the software of the kiosk device; and captured visual data showing at least facial expressions and eye movements of the user at the kiosk device;

analyzing, by the computer, the data to determine a type of conflict is present for at least one user with the software of the kiosk device;

determining, by the computer, a type of conflict exists for the at least one user; and providing, by the computer, the at least one user with one or more resolutions to aid in alleviating the determined type of conflict.

8. The computer program product of claim 7, wherein the audio statements captured are analyzed by applying voice-to-text analysis and detection of variations in the audio as spoken by the user to determine sentiment.

9. The computer program product of claim 7, wherein visual data captured is analyzed through facial expression analysis to determine a sentiment of the user and eye tracking to determine how the eyes of the user interact with the software of the kiosk device during the interaction.

10. The computer program product of claim 7, wherein the resolutions provided to aid in alleviating the determined type of conflict are selected based on a collective user history regarding conflict resolution and a category to which the at least one user has been determined to belong.

11. The computer program product of claim 7, further comprising the program instructions of: generating, by the computer, a table with detected conflicts from multiple users and resolutions attempted.

12. The computer program product of claim 11, wherein the table further comprises data selected from the group consisting of: usability and summary usage metrics; identified sources and causes of the conflicts, user profiles generated for more realistic user personas for user interface testing; and a type of users that utilize the kiosk device with one or more types of conflicts which are commonly encountered by that type of user.

13. A computer system for providing support for conflict resolution during an interaction between a user and software of a kiosk, the kiosk device comprising a computer comprising at least one processor, one or more memories, one or more computer readable storage media having program instructions executable by the computer to perform the program instructions comprising:

providing support for conflict resolution during an interaction between a user and software of a kiosk device comprising the steps of:

receiving, by the computer, data from one or more kiosk devices in a venue comprising: audio statements from the user during the interaction between the user and the software of the kiosk device; and captured visual data showing at least facial expressions and eye movements of the user at the kiosk device;

analyzing, by the computer, the data to determine a type of conflict is present for at least one user with the software of the kiosk device;

determining, by the computer, a type of conflict exists for the at least one user; and providing, by the computer, the at least one user with one or more resolutions to aid in alleviating the determined type of conflict.

14. The computer system of claim 13, wherein the resolutions provided to aid in alleviating the determined type of conflict are selected based on a collective user history regarding conflict resolution and a category to which the at least one user has been determined to belong.

15. The computer system of claim 13, further comprising the program instructions of: generating, by the computer, a table with detected conflicts from multiple users and resolutions attempted.

16. The computer system of claim 15, wherein the table further comprises data selected from the group consisting of: usability and summary usage metrics; identified sources and causes of the conflicts, user profiles generated for more realistic user personas for user interface testing; and a type of users that utilize the kiosk device with one or more types of conflicts which are commonly encountered by that type of user.

17. The computer system of claim 13, wherein the audio statements captured are analyzed by applying voice-to-text analysis and detection of variations in the audio as spoken by the user to determine sentiment.

18. The computer system of claim 13, wherein visual data captured is analyzed through facial expression analysis to determine a sentiment of the user and eye tracking to determine how the eyes of the user interact with the software of the kiosk device during the interaction.

* * * * *